US011291207B2

(12) United States Patent
Bellandi et al.

(10) Patent No.: US 11,291,207 B2
(45) Date of Patent: Apr. 5, 2022

(54) PHITOSTEROLS SUSPENSION CONCENTRATES AND PROCESS OF PREPARATION THEREOF

(71) Applicant: ISAGRO S.P.A., Milan (IT)

(72) Inventors: Paolo Bellandi, Carcare (IT); Ilenia Fiorenza Mazzali, Novara (IT); Elisa Galimberti, Lissone (IT); Claudio Dacarro, Milan (IT)

(73) Assignee: ISAGRO S.P.A., Milan (IT)

( * ) Notice: Subject to any disclaimer, the term of this patent is extended or adjusted under 35 U.S.C. 154(b) by 172 days.

(21) Appl. No.: 16/618,870

(22) PCT Filed: Jun. 14, 2018

(86) PCT No.: PCT/IB2018/054385
§ 371 (c)(1),
(2) Date: Dec. 3, 2019

(87) PCT Pub. No.: WO2018/229710
PCT Pub. Date: Dec. 20, 2018

(65) Prior Publication Data
US 2020/0093134 A1    Mar. 26, 2020

(30) Foreign Application Priority Data
Jun. 15, 2017  (IT) .................. 102017000066508

(51) Int. Cl.
*A01N 45/00* (2006.01)
*A01N 25/04* (2006.01)

(52) U.S. Cl.
CPC ............. *A01N 45/00* (2013.01); *A01N 25/04* (2013.01)

(58) Field of Classification Search
CPC ................................ A01N 45/00; A01N 25/04
See application file for complete search history.

(56) References Cited

U.S. PATENT DOCUMENTS

| | | | |
|---|---|---|---|
| 3,881,005 A | 4/1975 | Thakkar et al. | |
| 2009/0004359 A1* | 1/2009 | Orikoshi | A23L 33/11 426/590 |
| 2010/0291198 A1 | 11/2010 | Bolkhovets et al. | |

FOREIGN PATENT DOCUMENTS

| | | | | |
|---|---|---|---|---|
| AU | 2005234649 A | 12/2005 | | |
| CN | 103262849 A | 8/2013 | | |
| CN | 104292041 A | 1/2015 | | |
| CN | 104355837 A | 2/2015 | | |
| WO | WO200045648 | * | 8/2000 | ............... A23L 1/30 |

OTHER PUBLICATIONS

Zanobini, Alessandra, "International Search Report and Written Opinion of the International Searching Authority for PCT/IB2018/054385," European Patent Office, dated Aug. 8, 2019.

Zanobini, Alessandra, "Communication Pursuant to Article 94(3) EPC and European Search Report for EP 18733348," European Patent Office, dated Oct. 12, 2020.

* cited by examiner

*Primary Examiner* — Trevor Love
(74) *Attorney, Agent, or Firm* — Florek & Endres PLLC

(57) ABSTRACT

Concentrated suspensions containing phytosterols are described, in an amount higher than 25% by weight, in addition to a process for their preparation and their relative use as stimulants of plant growth.

4 Claims, No Drawings

PHITOSTEROLS SUSPENSION CONCENTRATES AND PROCESS OF PREPARATION THEREOF

The present invention relates to concentrated suspensions of phytosterols and the preparation process thereof.

The present invention also relates to the use of said concentrated suspensions as plant growth stimulants.

STATE OF THE ART

Sterols are a class of chemical compounds deriving from sterol, a polycyclic compound composed of four condensed rings, and they play a fundamental role in the physiology of animals and plants.

When sterols are produced from plants, they are referred to as phytosterols. Among these the most important are campesterol, sitosterol, stigmasterol and the brassicasterol.

Phytosterols have a wide spectrum of use; they are present in fact in cosmetics, in food products as additive for reducing cholesterol levels, but they are also known in agriculture for their marked fertilizing activity, as described for example in patent applications CH206735, CN101948350, CN104292041 or CN104355837.

Numerous formulations containing phytosterols are known in the art for use in both the pharmaceutical field and also in the agrochemical field. These formulations can be in the form of solid or liquid preparations, or in the form of suspensions of solids in liquids.

For a correct use, the formulations must be capable of solubilizing, or dispersing, or they must give rise to stable emulsions when diluted in appropriate volumes of water, in turn applied to crops or on the soil in which the crop is grown, before or after sowing or germination.

Many agropharmaceuticals are validly used in the form of concentrated suspensions (CS), a specific type of liquid formulation in which the finely ground active ingredient is suspended in water with the addition of particular surfactants such as wetting agents, dispersants, rheology modifiers, antifoam agents and biocides, which improve their stability and make them more suitable for agricultural use.

There are numerous advantages of concentrated suspensions: a reduced environmental impact due to the absence of organic solvents, in addition to greater safety for the operator in applying the product to the ground.

Phytosterols, however, hardly lend themselves to being formulated as concentrated suspensions as, due to their chemical structure, they tend to increase the viscosity of the formulation and show signs of physical instability such as flocculation or aggregation.

Patent application CN103262849 describes aqueous suspensions comprising generic phytosterols in a wide range of concentrations, without providing specific examples, however, of compositions with high concentrations of phytosterols.

Patents U.S. Pat. Nos. 3,881,005, 4,195,084 and EP1197153 indicate in fact that the maximum concentration of phytosterols in an aqueous suspension for human use is equal to about 20-25% by weight, a limit concentration at which the suspension is described as being not excessively viscous and easy to pour.

More recently, patent U.S. Pat. No. 8,414,945 describes a composition with a high content of phytosterols, in the form of powder dispersible in water.

A similar formulation, however, has drawbacks for the agricultural operator due to difficulties in calculating the exact dosage to be applied and the risk of inhalation during the preparation operations of the mixture.

The need for liquid formulations is therefore strongly felt in the agrochemical sector, which, having a higher concentration, allow a reduced volume of the formulation to be used for reaching the dosage of use in a single treatment, with a consequent reduction in the production, transportation and disposal costs.

DESCRIPTION

Contrary to what is described above, the Applicant has now surprisingly found a process for the preparation of concentrated suspensions containing phytosterols in an amount higher than 25% by weight with respect to the total weight of the suspension.

The suspensions obtained by this process are stable over time, with no thickening phenomena and are easy to pour and suitable for use in the agricultural sector.

A first object of the present invention therefore relates to a process for the preparation of concentrated suspensions containing phytosterols in an amount higher than 25% by weight with respect to the total weight of the suspension, comprising a step for grinding said phytosterols and possible wetting agents and dispersing agents until an average particle size of less than 10 µm is reached.

Said grinding step can be carried out on the phytosterols, alone or mixed with wetting agents and dispersing agents or other co-formulants, or on the final concentrated suspension containing phytosterols, wetting agents and dispersing agents and other co-formulants dissolved or dispersed in water.

Said grinding allows a particle size of the particles to be reached, preferably equal to or less than 10 µm for Dv 50 and 30 µm for Dv 90.

The term "Dv 50" represents the value of the average diameter below which there is 50% of the particles.

The term "Dv 90" represents the value of the average diameter below which there is 90% of the particles.

As is well known to skilled persons in the field, said grinding is effected at a controlled temperature ranging from 15 to 45° C.

The preparation of the above-mentioned concentrated suspensions is effected according to known methods, by mixing the components in the desired ratios and in any order.

The preparation process according to the present invention allows a concentrated suspension of phytosterols to be obtained in an amount higher than 25% by weight of phytosterols with respect to the total weight of the suspension, surprisingly with respect to what is described in the state of the art.

This process can also be used for concentrated suspensions containing phytosterols in an amount lower than 25% by weight with respect to the total weight of the suspension, also in this case providing a stable and pourable formulation and therefore suitable for use in the agricultural field.

A further object of the present invention therefore relates to a concentrated suspension comprising:

a) at least one phytosterol in an amount higher than 25% by weight with respect to the total weight of the concentrated suspension;

b) one or more wetting agents in an amount ranging from 1% to 5% by weight with respect to the total weight of the concentrated suspension;

c) one or more dispersing agents in an amount ranging from 1% to 5% by weight with respect to the total weight of the concentrated suspension.

Said phytosterols are selected from alpha-sitosterol, beta-sitosterol, stigmasterol, ergosterol, campesterol, alpha-spinosterol, brassicasterol and mixtures thereof.

Said phytosterols are preferably selected from beta-sitosterol, stigmasterol, campesterol, brassicasterol and mixtures thereof. The phytosterols in the concentrated suspension according to the present invention are more preferably a mixture of beta-sitosterol, stigmasterol, campesterol and brassicasterol.

In the above mixture of phytosterols, the beta-sitosterol is present in an amount ranging from 40% to 45% by weight, the campesterol is present in an amount ranging from 20% to 25% by weight, the stigmasterol is present in an amount ranging from 20% to 30% by weight and the brassicasterol is present in an amount ranging from 1% to 5% by weight, with respect to the total weight of the mixture of phytosterols.

In the above-mentioned mixture of phytosterols, the beta-sitosterol is present in an amount of about 43% by weight, the campesterol is present in an amount of about 24% by weight, the stigmasterol is present in an amount of about 26% by weight and the brassicasterol is present in an amount of about 2% by weight, with respect to the total weight of the mixture of phytosterols.

Said mixture of phytosterols is present in the concentrated suspension of the invention in an amount higher than 25% by weight, preferably in an amount ranging from 26% to 40% by weight, more preferably ranging from 26% to 35% by weight, with respect to the total weight of the concentrated suspension.

Said one or more wetting agents are selected from non-ionic surfactants, anionic surfactants and mixtures thereof, said one or more wetting agents are preferably anionic surfactants.

The non-ionic surfactants used as wetting agents are preferably selected from esters of sorbitan and ethoxylated fatty alcohols.

The anionic surfactants used as wetting agents are preferably selected from sulfosuccinates and sulfonated alkylnaphthalene and their salts; they are more preferably sulfosuccinates and salts thereof, and even more preferably a sulfosuccinate sodium salt.

According to the present invention, said one or more wetting agents are present in the concentrated suspension in an amount ranging from 1% to 5% by weight, preferably from 2% to 4% by weight, and are more preferably equal to about 3% by weight, with respect to the total weight of the concentrated suspension.

Said one or more dispersing agents are selected from non-ionic surfactants, anionic surfactants and mixtures thereof, said one or more dispersing agents are preferably anionic surfactants.

The non-ionic surfactants used as dispersing agents are preferably selected from ethoxy-propoxylated block copolymers, acrylic polymers, polycarboxylates, methyl oleyl taurates, tristyrylphenol ethoxylates, tristyrylphenol ethoxy-propoxylates, tristyrylphenol phosphate ethoxylates, tristyrylphenol sulfate ethoxylates, alkyl polyglucosides and mixtures thereof.

The anionic surfactants used as dispersing agents are preferably selected from tristyrylphenol phosphate ethoxylates, tristyrylphenol sulfate ethoxylates, condensed alkylnaphthalene sulfonates, ligninosulfonates and mixtures thereof. They are more preferably selected from condensed alkylnaphthalene sulfonates and ligninosulfonates.

According to the present invention, said one or more dispersing agents are present in the concentrated suspension in an amount ranging from 1% to 5% by weight, preferably from 1.5% to 3% by weight, more preferably equal to about 2% by weight, with respect to the total weight of the concentrated suspension.

As is well known to skilled persons in the field, the concentrated suspensions of the inventions can also comprise further surfactants and co-formulants, such as rheology modifiers, antifoam agents and biocides/preservatives.

Optionally, further compounds can also be added to the above concentrated suspensions for improving the biological activity.

Examples of these compounds are mineral salts, such as for example, compounds of nitrogen, phosphorous, potassium and known mixtures thereof such as NPK, algae, humic acids, fulvic acids, stillage, molasses.

The complement to 100 consists of the solvent, i.e. water.

The concentrated suspensions according to the present invention also show a high biostimulating activity, intended as a stimulant of plant growth and do not show any phytotoxicity with respect to the application crops. These characteristics make them suitable for use in the agricultural field in the stimulation of plant growth.

A further object of the present invention therefore relates to the use of the above-mentioned concentrated suspensions as stimulants of plant growth.

The Applicant has in fact verified that these concentrated suspensions are capable of stimulating the metabolism of plants also in the presence of stress (cold, salinity of the soil), determining the development and enlargement of the fruit and also preventing senescence of the plant.

The concentrated suspensions according to the present invention can be applied to the crop via the leaves, or to the soil by means of fertigation, or incorporation into the ground, or through seed tanning.

Examples of crops of interest are fruit trees, vegetables and extensive crops such as rice and wheat.

A further object of the present invention therefore relates to a method for stimulating plant growth in cultivated areas, which consists in applying effective and non-phytotoxic doses of said concentrated suspensions, on any part of the plant.

The amount of formulation to be applied in order to obtain the desired effect can vary according to various factors such as, for example, the phytosterols used, the crop, the climatic conditions, the characteristics of the soil, the application method, etc. Overall dosages of formulations ranging from 50 ml to 4 l per hectare of agricultural crop generally provide a sufficient activity.

The following examples are now provided for a better understanding of the invention, which should be considered as being illustrative and non-limiting of the same.

Example 1

| Components | % (by weight) |
|---|---|
| Mixture of phytosterols | 31.6 |
| Antifoam agent | 1 |
| Biocide | 0.09 |
| Imbirol OT/Na 70 | 3 |
| Supragil MNS 88 | 2 |
| Water | 62.31 |
| TOTAL | 100 |

The mixture of phytosterols refers to the mixture of beta-sitosterol, campesterol, stigmasterol and brassicasterol, previously indicated as the preferred mixture: the beta-sitosterol is present in an amount equal to about 43% by weight, the campesterol is present in an amount equal to about 24% by weight, the stigmasterol is present in an amount equal to about 26% by weight and the brassicasterol is present in an amount equal to about 2% by weight, with respect to the total weight of the mixture of phytosterols.

The antifoam agent is a polydimethylsiloxane.

The biocide is 2,2',2"-(hexahydro-1,3,5-triazin-1-1,3,5-triyl)triethanol.

Imbirol OT/Na 70 corresponds to the sodium salt of a dialkylsulfosuccinate.

Supragil MNS 88 corresponds to the sodium salt of methylnaphthalenesulfonic acid.

Example 2

| Component | % (by weight) |
|---|---|
| Mixture of phytosterols | 31.6 |
| Antifoam agent | 1 |
| Biocide | 0.09 |
| Imbirol OT/Na 70 | 3 |
| Supragil MNS 90 | 2 |
| Water | 62.31 |
| TOTAL | 100 |

The mixture of phytosterols refers to the mixture of beta-sitosterol, campesterol, stigmasterol and brassicasterol, previously indicated as the preferred mixture: the beta-sitosterol is present in an amount equal to about 43% by weight, the campesterol is present in an amount equal to about 24% by weight, the stigmasterol is present in an amount equal to about 26% by weight and the brassicasterol is present in an amount equal to about 2% by weight, with respect to the total weight of the mixture of phytosterols.

The antifoam agent is a polydimethylsiloxane.

The biocide is 2,2',2"-(hexahydro-1,3,5-triazin-1-1,3,5-triyl)triethanol.

Imbirol OT/Na 70 corresponds to the sodium salt of a dialkylsulfosuccinate.

Supragil MNS 90 corresponds to the sodium salt of methylnaphthalenesulfonic acid, polymer with formaldehyde.

Example 3

| Component | % (by weight) |
|---|---|
| Mixture of phytosterols | 31.6 |
| Antifoam agent | 1 |
| Biocide | 0.09 |
| Imbirol OT/Na 70 | 3 |
| Vanisperse CB | 2 |
| Water | 62.31 |
| TOTAL | 100 |

The mixture of phytosterols refers to the mixture of beta-sitosterol, campesterol, stigmasterol and brassicasterol, previously indicated as the preferred mixture: the beta-sitosterol is present in an amount equal to about 43% by weight, the campesterol is present in an amount equal to about 24% by weight, the stigmasterol is present in an amount equal to about 26% by weight and the brassicasterol is present in an amount equal to about 2% by weight, with respect to the total weight of the mixture of phytosterols.

The antifoam agent is a polydimethylsiloxane.

The biocide is 2,2',2"-(hexahydro-1,3,5-triazin-1-1,3,5-triyl)triethanol.

Imbirol OT/Na 70 corresponds to the sodium salt of a dialkylsulfosuccinate Vanisperse CB corresponds to a sodium ligninsulfonate.

The formulations of Examples 1-3 were subjected to the accelerated stability test (according to Cipac MT 46.1) which aims at accelerating the aging of the product by heating. This test serves to mimic the stability of a specific formulation after 2 years of storage at room temperature.

The procedure is the following: a certain quantity of formulation (for example 500 mL) is inserted in a hermetically closed container which is left in an oven at 54° C. for 14 days. After this period of time, the container is removed from the oven and is left to return to room temperature. It is then verified that the formulation has not undergone phase separation or other phenomena of physical instability such as flocculation, aggregation or crystalline growth.

Example 4

Pea Test Application to the Soil Production Evaluation

The effect on the final production of dwarf pea plants of two formulations CS at 31.6%, one containing the formulation of Example 1 and the other the same formulation not ground, was evaluated after application to the soil.

Seeds of "Meraviglia d'Italia" dwarf peas were sown in pots having a diameter of 15 cm, suitably filled with a mixture of earth and soil previously sterilized.

The first treatment was carried out 12 days after sowing, pouring a quantity of 400 g/ha of formulation at the collar of the plant. Each pot contained 5 seedlings and there were 4 replicas for each thesis. The plants were kept in a greenhouse, at a temperature of 24° C. during the day and 18° C. overnight, photoperiod: 16 hours of light and 8 hours of darkness. A total of 4 treatments were carried out during the experiment, at 10-day intervals.

The final survey provided for the evaluation of the number of pods that had not yet reached maturity, the number of ripe pods, the number of seeds contained in them and their dry weight. The flowers still present on the plant at the time of harvesting were also counted.

| PRODUCTS | Average Nr. of FLOWERS | Average DRY WT. OF SEEDS* | Average Nr. of RIPE SEEDS | Average Nr. of UNRIPE SEEDS | Average Nr. of SEEDS |
|---|---|---|---|---|---|
| UTC | 1.25 | 1.04 | 3.50 | 4.25 | 5.00 |
| CS 31.6% NOT ground | 1.00 | 1.78 | 6.00 | 0.50 | 9.50 |
| Formulat. Exa. 1 | 1.00 | 3.05 | 6.50 | 0.75 | 14.00 |

The results obtained showed the positive effect of the two formulations which induced the maturation of a greater number of pods with a consequent increase in the number of seeds produced. Between the two formulations tested, that containing the ground technical product according to the invention gave the best results.

Example 5

Cucumber Test Application to the Soil Evaluation of the Plant Vigour

The effect on the biomass of cucumber plants of two formulations CS at 31.6%, one containing the formulation of Example 1 and the other the same formulation not ground, was evaluated after application to the soil.

"Long China" cucumber seedlings were transplanted at the stage of 2 real leaves, in pots having a diameter of 11 cm, suitably filled with a mixture of earth and soil previously sterilized. The treatment was carried out the day after the transplantation, pouring a quantity of formulation equal to a dose of 400 g/ha at the collar of the plant. Each pot contained 1 seedling and 5 replicas were present for each thesis. The plants were kept in an air-conditioned cell, at a temperature of 24° C. photoperiod: 16 hours of light and 8 hours of darkness.

The final survey provided for the evaluation of the fresh weight of the green biomass, carried out two weeks after the transplantation.

| PRODUCTS | Average WEIGHT (g) | WEIGHT sum (g) |
|---|---|---|
| UTC | 13.55 | 67.74 |
| Formulation of Example 1 | 14.59 | 72.95 |
| CS 31.6% NOT ground | 12.53 | 62.64 |

The results obtained showed the positive effect of the formulation containing the ground technical product according to the present invention: the plants treated with this product, in fact, had a more developed biomass with respect to the blank and the formulation containing the non-ground technical product.

Example 6

Cucumber Test Leaf Application Evaluation of the Plant Vigour

The effect on the biomass of cucumber plants of two formulations CS at 31.6%, one containing the formulation of Example 1 and the other the same formulation not ground, was evaluated after application to the leaves.

"Long China" cucumber seedlings were transplanted at the stage of 2 real leaves, in pots having a diameter of 11 cm, suitably filled with a mixture of earth and soil previously sterilized. The treatment was carried out the day after the transplantation, spraying the leaves with a quantity of 6 g/hl, using a sprayer machine. Each pot contained 1 seedling and 5 replicas were present for each thesis. The plants were kept in an air-conditioned cell, at a temperature of 24° C., photoperiod: 16 hours of light and 8 hours of darkness.

2 treatments were carried out during the experiment, at 5-day intervals.

The final survey provided for the evaluation of the fresh weight of the green biomass, carried out two weeks after the transplantation.

| PRODUCTS | Average WEIGHT (g) | WEIGHT sum (g) |
|---|---|---|
| UTC | 15.18 | 75.9 |
| CS 31.6% NOT ground | 16.214 | 81.07 |
| Formulation Example 1 | 16.838 | 84.19 |

The results obtained showed the positive effect of the formulation containing the ground technical product according to the present invention, also when applied via the leaves: the plants treated with this product, in fact, had a more developed biomass with respect to the blank and the formulation containing the non-ground technical product.

The invention claimed is:

1. A process for the preparation of concentrated suspensions comprising:
   a) a phytosterol mixture of beta-sitosterol, stigmasterol, campesterol and brassicasterol, in an amount higher than 25% by weight with respect to the total weight of the concentrated suspension, wherein beta-sitosterol is present in an amount ranging from 40% to 45% by weight with respect to the total weight of the mixture of phytosterols, the campesterol is present in an amount ranging from 20% to 25% by weight with respect to the total weight of the mixture of phytosterols, the stigmasterol is present in an amount ranging from 20% to 30% by weight with respect to the total weight of the mixture of phytosterols and the brassicasterol is present in an amount ranging from 1% to 5% by weight with respect to the total weight of the mixture of phytosterols;
   b) one or more wetting agents in an amount ranging from 1% to 5% by weight with respect to the total weight of the concentrated suspension;
   c) one or more dispersing agents in an amount ranging from 1% to 5% by weight with respect to the total weight of the concentrated suspension;
   said process comprising a grinding step of said phytosterols, wetting agents and dispersing agents until an average particle size of less than 10 μm is reached.

2. The process according to claim 1, wherein the grinding step is carried out on said phytosterols, wetting agents and dispersing agents, or on the final concentrated suspension containing said phytosterols, wetting agents, dispersing agents and other co-formulants dispersed in water.

3. The process according to claim 1, wherein said phytosterols, wetting agents and dispersing agents have a particle size equal to 10 μm for Dv 50 and 30 μm for Dv 90.

4. The process according to claim 1, wherein the grinding step is carried out at a temperature ranging from 15° C. to 45° C.

* * * * *